Patented Dec. 17, 1940

2,224,912

UNITED STATES PATENT OFFICE 2,224,912

MANUFACTURE OF BUTADIENE

Rowland Hill and Elias Isaacs, Blackley, Manchester, England, assignors to Imperial Chemical Industries Limited, a corporation of Great Britain No Drawing. Application July 16, 1937, Serial No. 154,099. In Great Britain July 28, 1936

4 Claims. (Cl. 260—681)

This invention relates to the manufacture of butadiene.

This invention has as an object to provide a new method of manufacturing butadiene. Further objects will appear hereinafter.

These objects are accomplished by the following invention. We have found that we can manufacture butadiene by heating 2:3-butylene glycol esters of monocarboxylic acids in gaseous form at a temperature at which they decompose.

The heat treatment is conveniently conducted by passing the gaseous ester through a heated tube or other vessel, if desired in admixture with an inert diluent gas, such as nitrogen or benzene vapour. The vessel may be constructed of iron, steel, heat-resistant glass or other suitable material for such purpose and may be packed with, for example, broken quartz, earthenware rings, steel shavings, silica gel or active carbon.

The best temperature for the process depends to some extent upon the particular ester used and also upon such factors as the nature of the heating vessel and the rate of passing the gas. In nearly all instances it will be found to be between 475° and 600° C. Outside this temperature range the yield of butadiene tends to decline. It appears that the process of decomposition of a di-ester to butadiene may take place, at least in part, in two stages, of which the first is the formation of an α-methylallyl ester, and that below 475° C. the second stage does not take place so readily. Above 600° C. it appears that the butadiene may enter into some secondary reaction.

In order to obtain the highest percentage conversion of ester to butadiene, the gases obtained from the heating chamber can be treated to remove the butadiene gases and then passed through the heating chamber again, or a more complicated process of recirculation may be employed.

The invention may be more particularly illustrated by reference to 2:3-butylene glycol diacetate, which is one of the most convenient esters to employ. Working with this ester and using a recirculating process it is possible to obtain a 90% yield of very pure butadiene.

2:3-butylene glycol diacetate is readily obtainable by esterifying 2:3-butylene glycol with acetic acid. This esterification may be conveniently effected by heating together the glycol and acetic acid and benzene and a little sulphuric acid. The purpose of the benzene is to distil off and carry with it the water formed during the esterification. The distilled benzene can conveniently be allowed to return to the esterification mixture after it has been separated from the water. When esterification is complete the butylene glycol diacetate is isolated from the esterification mixture by distillation. It is not however necessary to isolate the butylene glycol diacetate from the esterification mixture, since it has been found that there is little or no loss in yield and purity of the butadiene, when the esterification mixture is subjected as such to the heat treatment. The above process has the advantage that the acetic acid which is produced in the decomposition of the diacetate can be reused.

The following examples illustrate but do not limit the invention.

Example 1

2:3-butylene glycol diacetate (the preparation of which is described below) is boiled and the vapours passed through heated quartz tubes. The tubes are cylindrical 4 sq. cm. in cross section and 80 cm. long and are packed with quartz chips; they are kept at 550° C. and the butylene glycol diacetate and the vapour are fed in at the rate of about 200 gm. per tube per hour.

The issuing gases are passed through a water-cooled condenser where acetic acid and unchanged ester liquefy (together with a little butadiene which they absorb) and the uncondensed gas, which is butadiene, passes on and is liquified in a vessel suitably cooled, e. g. with ethyl alcohol and solid carbon dioxide. A good yield of butadinene is obtained and a good recovery of acetic acid.

The 2:3-butylene glycol diacetate is made as follows. A mixture of 100 parts of 2:3-butylene glycol, (as obtained by fermentation process) 266 parts of acetic acid, 100 parts of benzene and 6 parts of 98% sulphuric acid is boiled in an apparatus in which the water produced in the esterification distils with the benzene, from which it is continuously separated, the benzene returning to the esterification mixture. Boiling is continued until no more water distils, the residual benzene and acetic acid in the mixture are thus distilled off and then the diacetate. A good yield is obtained.

Example 2

2:3-butylene glycol diacetate is fed by gravity into vertical glass tubes (4.5 cm. in diameter, 90 cm. long) packed with unglazed earthenware rings for a length of 80 cm. and heated to 510–515° C. The feeding is at the rate of approximately 450 gm. per litre of packed space per hour. The issuing gases are passed through a short air condenser into a vessel fitted with a water reflux condenser and an exit tube and kept at a temperature of 100-120° C. By this means the acetic acid formed during the pyrolysis is stripped from butadiene. The gas not condensed by the water condenser passes on through drying towers and is then either condensed by suitable freezing mixtures and collected in pressure vessels or compressed into cylinders by means of pumps. The mixture obtained in the first receiver, maintained at 100-120° C. containing acetic acid and unchanged ester, is recycled twice through the decomposition tubes. A total yield of 84% of butadiene of a high order of purity (96% or over) is obtained. This is equivalent to a yield of 93% on the ester converted.

The residual liquors containing the unchanged diacetate and acetic acid may be used in further esterifications of 2:3-butylene glycol.

Stainless steel turnings can be used instead of earthenware rings as packing material without detriment to the yield or quality of the butadiene.

*Example 3*

An esterification mixture, containing approximately 1740 parts of 2:3-butylene glycol diacetate, and made from 1000 parts by weight of 2:3-butylene glycol, 2000 parts of glacial acetic acid, 400 parts of benzene and 18 parts of 98% sulphuric acid is, without any further treatment passed through heated glass tubes, and the issuing gases passed through coolers as in Example 2. The condensed liquors, stripped from butadiene are recycled twice and 460 parts of butadiene are obtained. This yield corresponds to a yield of at least 90% based on the ester converted, and the purity of the butadiene is very high.

The residual benzene, acetic acid mixture may be used for further esterification of 2:3-butylene glycol.

*Example 4*

2:3-butylene glycol diformate (a new compound b. p. 178° C./760 m. m.) is prepared from the glycol and formic acid in a manner similar to the preparation of the diacetate as shown in Example 1.

The vapours of 2:3-butylene glycol diformate are passed through quartz tubes (4 sq. cm. cross-section, 80 cm. long), which are packed with quartz chips and heated to a temperature of 550° C., at a rate of 100 gm. per tube per hour. Butadiene is produced, together with gases such as carbon monoxide, carbon dioxide, and hydrogen which are formed by the decomposition of the generated formic acid. These gases are absorbed in the usual manner, leaving butadiene in a high state of purity or may be removed by condensing the butadiene as in Example 1.

The esters which we use in this invention may be mono- or di-esters and the monocarboxylic acids may be aliphatic or aromatic. Examples of suitable aliphatic acids are formic, acetic, propionic, butyric, and isobutyric, while examples of suitable aromatic ones are benzoic, and ortho- and para-toluic.

Among particular esters which are suitable there may be mentioned the di-esters of formic, acetic, and propionic acids, the monoester of acetic acid and the diester of benzoic acid. The diester of acetic acid is especially suitable.

As many apparently widely different embodiments of this invention may be made without departing from the spirit and scope thereof, it is to be understood that we do not limit ourselves to the specific embodiments thereof except as defined in the appended claims.

We claim:

1. The process for the production of butadiene which comprises heating a monocarboxylic acid ester of 2,3-butylene glycol in the vapor phase to a temperature between 475° C. and 600° C.

2. The process in accordance with claim 1 characterized in that the ester is 2,3-butylene glycol diacetate.

3. The process for the production of butadiene which comprises heating together 2,3-butylene glycol, a monocarboxylic acid, benzene, and sulfuric acid at a temperature sufficient to cause the esterification of the 2,3-butylene glycol and the distillation of the benzene, removing the water from the benzene distilled and returning same to the heating chamber, separating the crude 2,3-butylene glycol ester of the monocarboxylic acid, and heating same in the vapor phase at a temperature between 475° and 600° C., separating the products of thermal decomposition so as to recover butadiene.

4. The process in accordance with claim 3 characterized in that the monocarboxylic acid is acetic acid.

ROWLAND HILL.
ELIAS ISAACS.